(12) United States Patent
Shim

(10) Patent No.: US 10,198,105 B2
(45) Date of Patent: Feb. 5, 2019

(54) THIN FILM TRANSISTOR SUBSTRATE HAVING A PLURALITY OF STOPPER LAYERS ON THE SAME PLANE AS A TOUCH SENSING LINE AND DISPLAY PANEL HAVING THE SAME

(71) Applicant: LG DISPLAY CO., LTD., Seoul (KR)

(72) Inventor: Seok-Ho Shim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 130 days.

(21) Appl. No.: 15/218,723

(22) Filed: Jul. 25, 2016

(65) Prior Publication Data

US 2017/0031488 A1   Feb. 2, 2017

(30) Foreign Application Priority Data

Jul. 29, 2015   (KR) ........................ 10-2015-0106991

(51) Int. Cl.
| | | |
|---|---|---|
| *G06F 3/041* | (2006.01) | |
| *G02F 1/1333* | (2006.01) | |
| *G02F 1/1339* | (2006.01) | |
| *G06F 3/044* | (2006.01) | |
| *G02F 1/1335* | (2006.01) | |
| *G02F 1/1337* | (2006.01) | |

(52) U.S. Cl.
CPC ........ *G06F 3/0412* (2013.01); *G02F 1/13338* (2013.01); *G02F 1/13394* (2013.01); *G06F 3/044* (2013.01); *G02F 1/1337* (2013.01); *G02F 1/133512* (2013.01); *G02F 2001/13396* (2013.01); *G02F 2201/40* (2013.01)

(58) Field of Classification Search
CPC ........... G02F 1/13338; G02F 1/133512; G02F 1/1337; G02F 1/13394; G02F 2001/13396; G02F 2001/40; G06F 3/0412; G06F 3/044

See application file for complete search history.

(56) References Cited

U.S. PATENT DOCUMENTS

| | | | | |
|---|---|---|---|---|
| 2014/0111466 A1* | 4/2014 | Kim | ........................ | G06F 3/044 345/174 |
| 2015/0029148 A1* | 1/2015 | Wang | .................... | G06F 3/0412 345/174 |
| 2015/0098048 A1* | 4/2015 | Tomioka | ........... | G02F 1/133512 349/106 |

FOREIGN PATENT DOCUMENTS

KR   10-2007-0078178 A   7/2007

* cited by examiner

*Primary Examiner* — Ram A Mistry
(74) *Attorney, Agent, or Firm* — Birch, Stewart, Kolasch & Birch, LLP

(57) ABSTRACT

A substrate including a thin film transistor, which may prevent light leakage without a reduction in an aperture ratio, and a display panel having the same are discussed. In the display panel, stopper layers are spaced apart from each other with a space interposed therebetween and are located on the same plane as a touch sensing line, and a column spacer is located to overlap the space between the stopper layers.

14 Claims, 5 Drawing Sheets

THIN FILM TRANSISTOR SUBSTRATE HAVING A PLURALITY OF STOPPER LAYERS ON THE SAME PLANE AS A TOUCH SENSING LINE AND DISPLAY PANEL HAVING THE SAME

CROSS REFERENCE OF THE RELATED APPLICATIONS

This application claims the priority benefit of Korean Patent Application No. 10-2015-0106991, filed on Jul. 29, 2015, which is hereby incorporated by reference as if fully set forth herein.

BACKGROUND OF THE INVENTION

Field of the Invention

The present invention relates to a substrate including a thin film transistor and a display panel having the same, and more particularly, to a substrate including a thin film transistor, which may prevent light leakage without a reduction in an aperture ratio, and to a display panel having the same.

Discussion of the Related Art

An image display, which displays various information on a screen, is a core technology of the information communication era and is being developed to achieve thinner, lighter, more portable and better-performing products. Accordingly, flat panel displays, which may overcome the disadvantage of the weight and volume of cathode ray tubes (CRT), are in the spotlight.

Among flat panel displays, a liquid crystal display displays an image by adjusting the light transmittance of liquid crystals via an electric field, which is formed between a common electrode and a pixel electrode connected to a thin film transistor. The liquid crystal display is formed such that a substrate including a color filter and a substrate including a thin film transistor are bonded to each other with a liquid crystal layer interposed therebetween. At this time, a column spacer is formed between the thin film transistor substrate and the color filter substrate in order to maintain a cell gap.

When pressure is applied from outside the liquid crystal display, the column spacer is moved by the pressure. The movement of the column spacer causes damage to an alignment film, which is in contact with the column spacer. Because the damaged alignment film cannot align liquid crystals in a desired direction, light leakage occurs in the damaged region of the alignment film, which is problematic. In particular, when the substrate is reduced in thickness to achieve a thinner liquid crystal display, the substrate having a reduced thickness is easily deformed even by small pressure, whereby light leakage from the thin liquid crystal display is increased somewhat. Although the line width of a black matrix around the column spacer may be increased in order to solve this light leakage problem, this decreases an aperture ratio.

SUMMARY OF THE INVENTION

Accordingly, the present invention is directed to a substrate including a thin film transistor and a display panel having the same that substantially obviate one or more problems due to limitations and disadvantages of the related art.

An object of the present invention is to provide a substrate including a thin film transistor, which may prevent light leakage without a reduction in an aperture ratio, and a display panel having the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a display panel in accordance with an aspect of the present invention, a plurality of stopper layers is spaced apart from each other with a space interposed therebetween and is located on the same plane as a touch sensing line, and a column spacer is located to overlap the space between the stopper layers.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Hereinafter, the embodiments of the present invention will be described in detail with reference to the accompanying drawings.

Figure 1:
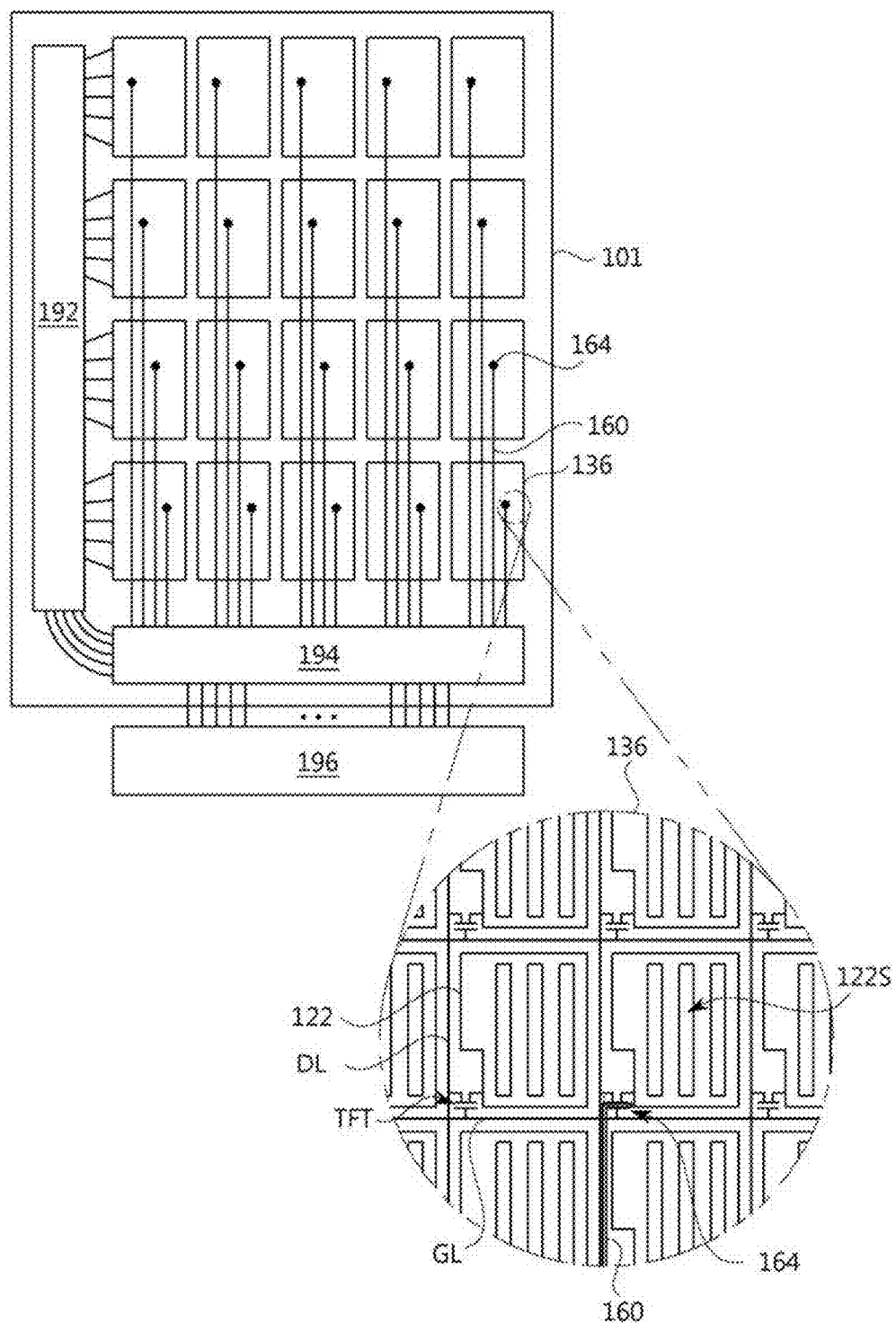
FIG. 1 is a view illustrating an in-cell touch type display in accordance with one or more embodiments of the present invention.

FIG. 1 is a block diagram illustrating an in-cell touch type display in accordance with one or more embodiments of the present invention. All the components of the in-cell touch type display according to all embodiments of the present invention are operatively coupled and configured.

The touch display illustrated in FIG. 1 includes a data driver 194, a gate driver 192, a touch driver 196, and a display panel.

The data driver 194 converts digital data from a timing controller into an analogue data voltage in response to a data control signal from the timing controller, and supplies the analogue data voltage to data lines DL.

The gate driver 192 sequentially drives gate lines GL of the display panel in response to a gate control signal from the timing controller. The gate driver 192 supplies the scan pulse of a gate-on voltage for every corresponding scan period of each gate line GL, and supplies a gate-off voltage for the remaining period during which the other gate lines GL are driven. The gate driver 192 is formed in a non-display area on one side or both sides of a substrate 101, simultaneously with the manufacture of a thin film transistor (TFT) of each pixel.

The touch driver 196 is connected to a touch sensing line 160 of the display panel, and receives a user touch signal from the touch sensing line 160. The touch driver 196 detects whether or not a user touch is input and a touch position by sensing variation in capacitance attributable to the user touch.

Figure 2:
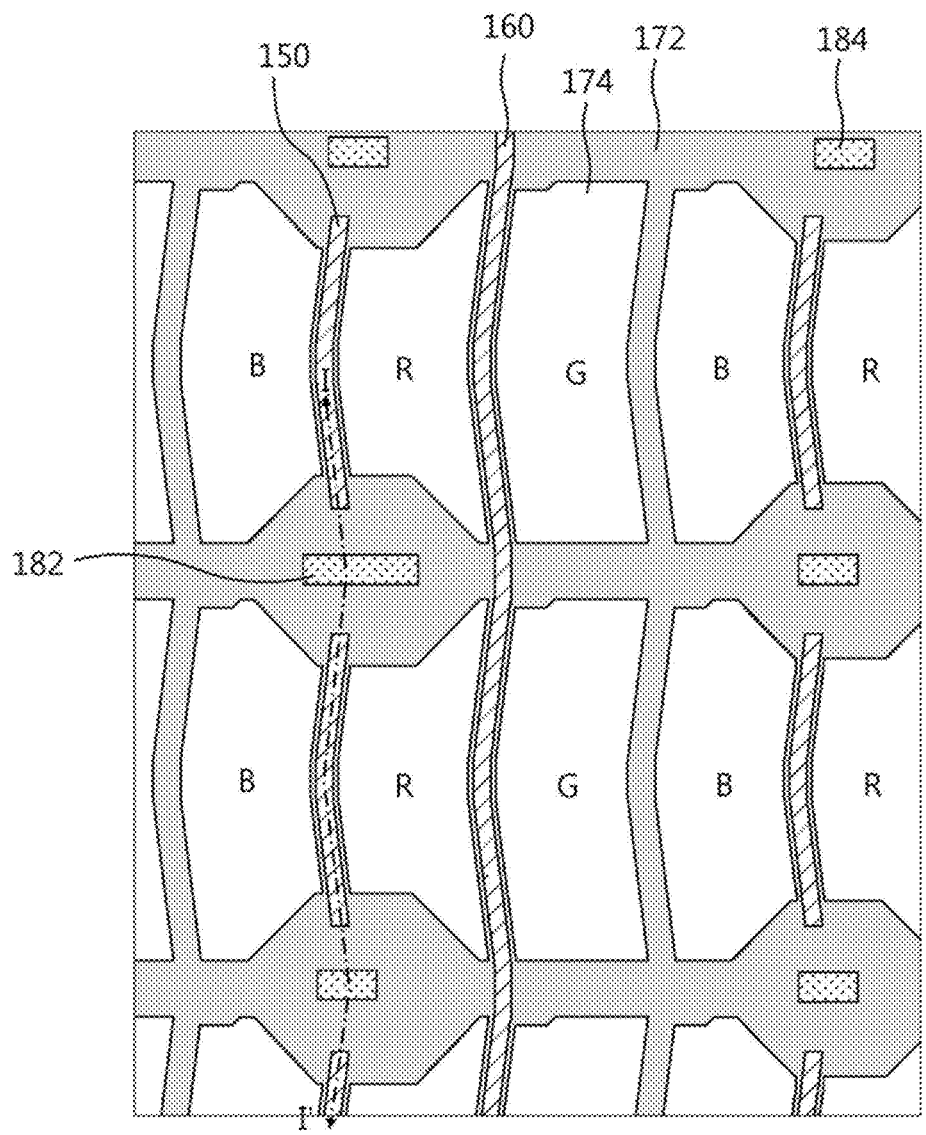
FIG. 2 is a plan view illustrating an in-cell touch type display panel in accordance with a first embodiment of the present invention.
Figure 3:
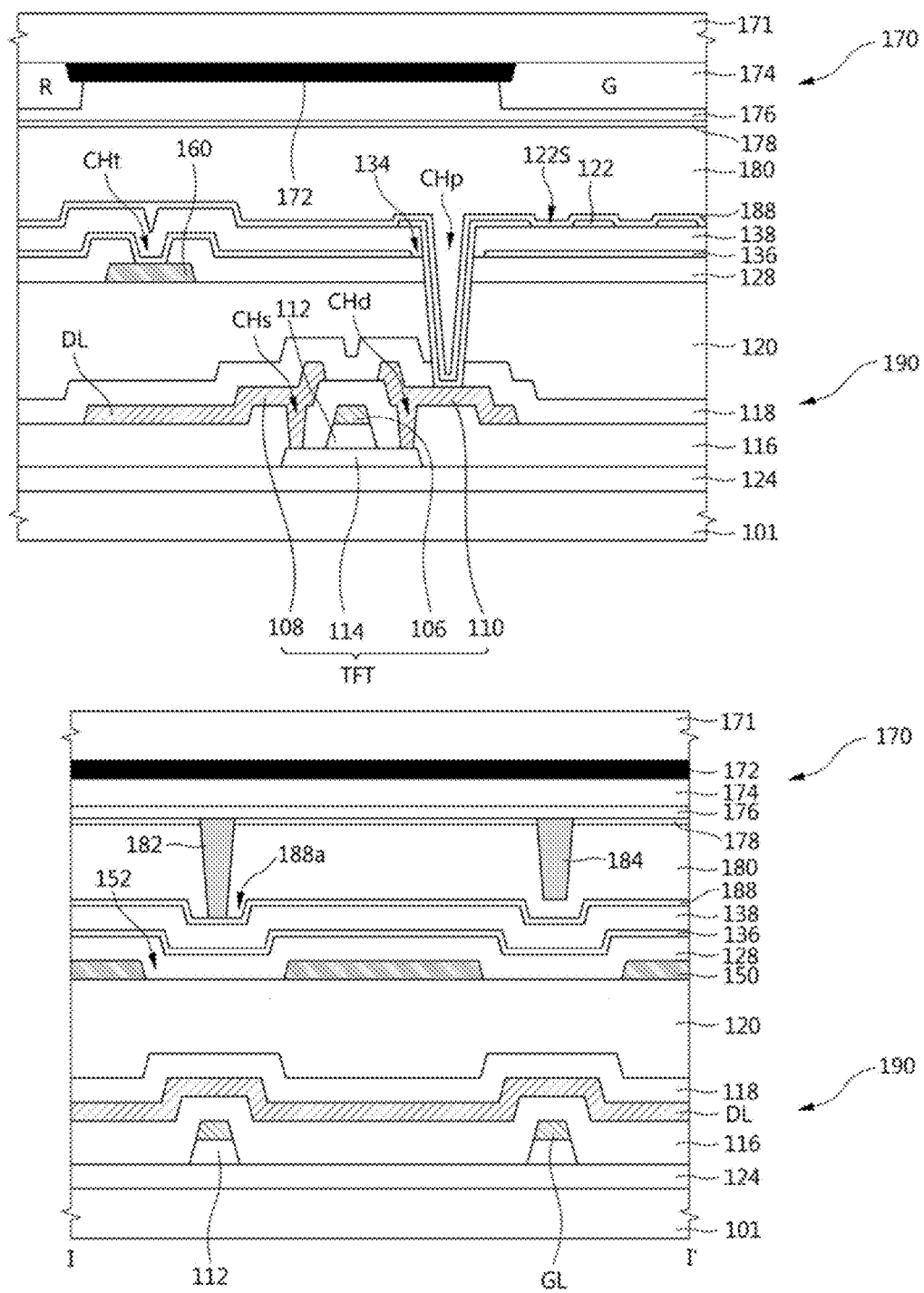
FIG. 3 is a sectional view illustrating the display panel having a touch sensing line, a stopper layer, and a column spacer illustrated in FIG. 2.

The display panel displays an image using a plurality of pixels arranged in a matrix form. When a liquid crystal panel is used as the display panel, the display panel includes a substrate 170 including a color filter, a substrate 190 including a thin film transistor, and a liquid crystal layer 180 between the substrates 170 and 190, as illustrated in FIGS. 2 and 3.

The substrate 170 including a color filter includes a black matrix 172, color filters 174, an overcoat layer 176, an upper alignment film 178, and first and second column spacers 182 and 184, which are formed on an upper substrate 171 in sequence.

The black matrix 172 serves to divide red, green, and blue sub-pixel areas from one another and to prevent light interference between the adjacent sub-pixel areas. The black matrix 172 is formed on the upper substrate 171 to overlap at least one of the gate line GL, the data line DL, the touch sensing line 160, and the thin film transistor TFT.

The red (R), green (G), and blue (B) color filters 174 are formed on the upper substrate 171 in the sub-pixel areas of the corresponding colors to create the corresponding colors.

The overcoat layer 176 is formed over the color filters 174 and the black matrix 172 using a transparent organic insulation material. The overcoat layer 176 compensates for the height difference between the color filters 174 and the black matrix 172.

The first column spacer 182 is used as a gap spacer for maintaining a cell gap between the thin film transistor substrate 190 and the color filter substrate 170. To this end, the first column spacer 182 is formed to the same height as the cell gap to come into contact with a lower alignment film 188, and has a greater area than the second column spacer 184. As such, the region of the black matrix 172, which corresponds to the first column spacer 182, is greater than the region of the black matrix 172, which corresponds to the second column spacer 184.

The second column spacer 184 is formed to a lower height than the first column spacer 182, and is used as a push spacer, which does not come into contact with the lower alignment film 188. The second column spacer 184 is used as a passage, which may be smoothly filled with liquid crystals upon the introduction of liquid crystals, and may allow the upper substrate 171 to be easily returned into an original state when pressure is applied to the upper substrate 171. To this end, the second column spacer 184 has a higher density than the first column spacer 182.

The thin film transistor substrate 190 includes the thin film transistor TFT connected to the gate line GL and the data line DL, which cross each other to define a pixel area, a pixel electrode 122, a common electrode 136, the touch sensing line 160, and a stopper layer 150.

The thin film transistor TFT charges the pixel electrode 122 with a data signal of the data line DL in response to a scan signal of the gate line GL, and maintains the pixel electrode 122 charged with the data signal. To this end, the thin film transistor TFT includes a gate electrode 106, a source electrode 108, a drain electrode 110, and an active layer 114 as illustrated in FIG. 3.

The gate electrode 106 overlaps a channel region of the active layer 114 with a gate insulation film 112 interposed therebetween.

The source electrode 108 is connected to a source region of the active layer 114 through a source contact hole CHs, which penetrates an interlayer insulation film 116.

The drain electrode 110 faces the source electrode 108, and is connected to a drain region of the active layer 114 through a drain contact hole CHd, which penetrates the interlayer insulation film 116. In addition, the drain electrode 110 is connected to the pixel electrode 122 through a pixel contact hole CHp.

The active layer 114 forms a channel between the source electrode 108 and the drain electrode 110. The active layer 114 includes the channel region, the source region, and the drain region. The channel region overlaps the gate electrode 106 with the gate insulation film 112 interposed therebetween. An n-type or p-type dopant is introduced into the source region and the drain region.

The thin film transistor described above is protected by a first protective film 118, which is formed of SiNx or SiOx.

The pixel electrode 122 is formed on a third protective film 138 in each pixel area, which is defined by the gate line GL and the data line DL crossing each other, to have a plurality of slits 122S. The pixel electrode 122 is electrically connected to the drain electrode 110, which is exposed through the pixel contact hole CHp.

The common electrode 136 is formed on a second protective film 128, and has an opening 134, which has a greater area than the pixel contact hole CHp, in a region overlapping the pixel contact hole CHp. The common electrode 136 overlaps the pixel electrode 122 in each pixel area with the third protective film 138 interposed therebetween. As such, the common electrode 136, to which a common voltage is supplied for a period during which an image is displayed, forms a fringe field in cooperation with the pixel electrode 122, to which a pixel voltage signal is supplied. Liquid crystal molecules, which are arranged between the thin film transistor substrate and the color filter substrate by the fringe field, are rotated by dielectric anisotropy. In addition, the transmittance of light passing through the pixel area changes depending on the degree of rotation of liquid crystal molecules, whereby gradation is realized.

In addition, the common electrode 136 serves as a sensing electrode, which senses a user touch position for a touch sensing period, which is a non-display period during which no image is displayed. To this end, a plurality of common electrodes 136 in block units is spaced apart from each other by a prescribed distance on the substrate 101 as illustrated in FIG. 1. Each of the common electrodes 136 has a size corresponding to at least one pixel area in consideration of the area of the user touch. The common electrode 136 is electrically connected to the touch sensing line 160 through a touch contact hole CHt. Here, the touch sensing line 160 transmits a user touch signal sensed by the common electrode 136 to the touch driver 196. As such, when the user touches the display panel, touch capacitance is generated between the common electrodes 136. The position of the user touch is detected by comparing the touch capacitance in response to the user touch with a reference capacitance, and an operation depending on the detected touch position is performed.

Meanwhile, each touch sensing line 160 is located on every unit pixel, which includes red (R), green (G) and blue (B) sub-pixels. Each touch sensing line 160 is formed to overlap the data line DL of at least one sub-pixel among the red (R), green (G) and blue (B) sub-pixels.

The stopper layer 150, which is parallel to the touch sensing line 160, is formed on either side of each of the first and second column spacers 182 and 184. That is, the stopper layer 150 is formed to overlap the data line DL of any one sub-pixel among the two remaining sub-pixels excluding the data line DL of the sub-pixel that overlaps the touch sensing line 160. For example, the touch sensing line 160 overlaps the data line DL of the green (G) sub-pixel, and also overlaps the black matrix 172, which is located between the red (R) and green (G) color filters 174. In addition, the stopper layer 150 overlaps the data line DL of the red (R) sub-pixel, and also overlaps the black matrix 172, which is located between the red (R) and blue (B) color filters 174.

The stopper layer 150 is formed on a planarization layer 120, which is in the same plane as the touch sensing line 160, using a metal, such as Al, Cu, Cr, Mo or Ti, which is the same material as the touch sensing line 160. Accordingly, the stopper layer 150 may be formed simultaneously with the touch sensing line 160 without an additional mask process, which may reduce the manufacturing costs.

In addition, each stopper layer 150 is formed to be spaced apart from the adjacent stopper layer 150 with a space 152 interposed therebetween, the space 152 overlapping each of the first and second column spacers 182 and 184. That is, the stopper layer 150 is spaced apart from the adjacent stopper layer 150 by a first distance in the region of the black matrix 172, which overlaps the intersection of the gate line GL and the data line DL. As such, the respective upper surfaces of the second and third protective films 128 and 138, disposed on the stopper layer 150, are recessed in the region corresponding to the space 152, such that a recess 188a is formed in the lower alignment film 188, which is formed on the third protective film 138. That is, the upper surface of the lower alignment film 118, corresponding to the space 152, is formed close to the upper surface of the planarization layer 120 than the upper surface of the lower alignment film 118 disposed on the stopper layer 150.

Figure 4:
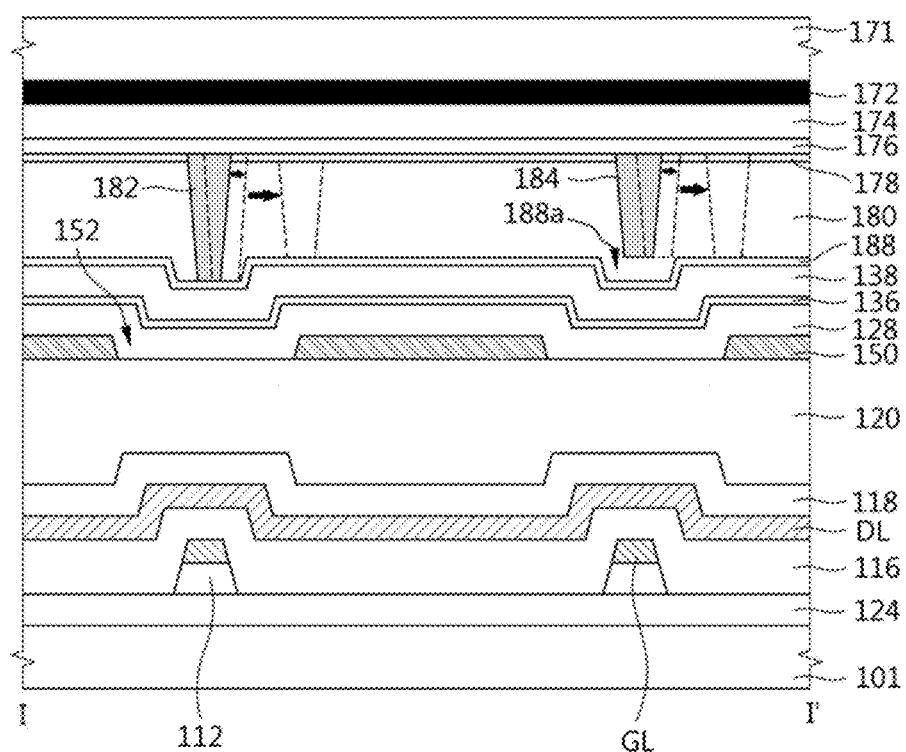
FIG. 4 is a sectional view illustrating variation in the position of the column spacer due to external force in the display panel having the stopper layer illustrated in FIG. 3.

Each of the first and second column spacers 182 and 184 is inserted into the recess 188a of the lower alignment film 188, which corresponds to the space 152 between the adjacent stopper layers 150. In this case, when external pressure is applied in the vertical direction, which is parallel to the longitudinal direction of the data line DL, as illustrated in FIG. 4, the movement of the first or second column spacer 182 or 184 is limited within the recess 188a, which overlaps the black matrix 172, due to the pressure. Therefore, damage to the lower alignment film 188 disposed in the pixel area may be prevented. Meanwhile, even if the first or second column spacer 182 or 184 moves out of the recess 188a in response to relatively strong external pressure, each of the first and second column spacers 182 and 184 slides along the stopper layer 150, which overlaps the black matrix 172. As such, it is possible to minimize the movement of the first and second column spacers 182 and 184 from the pixel area to the lower alignment film 188. Contact between the first and second column spacers 182 and 184 and the lower alignment film 188 located in the pixel area may be minimized, which may minimize damage to the lower alignment film 188 located in the pixel area.

Figure 5:
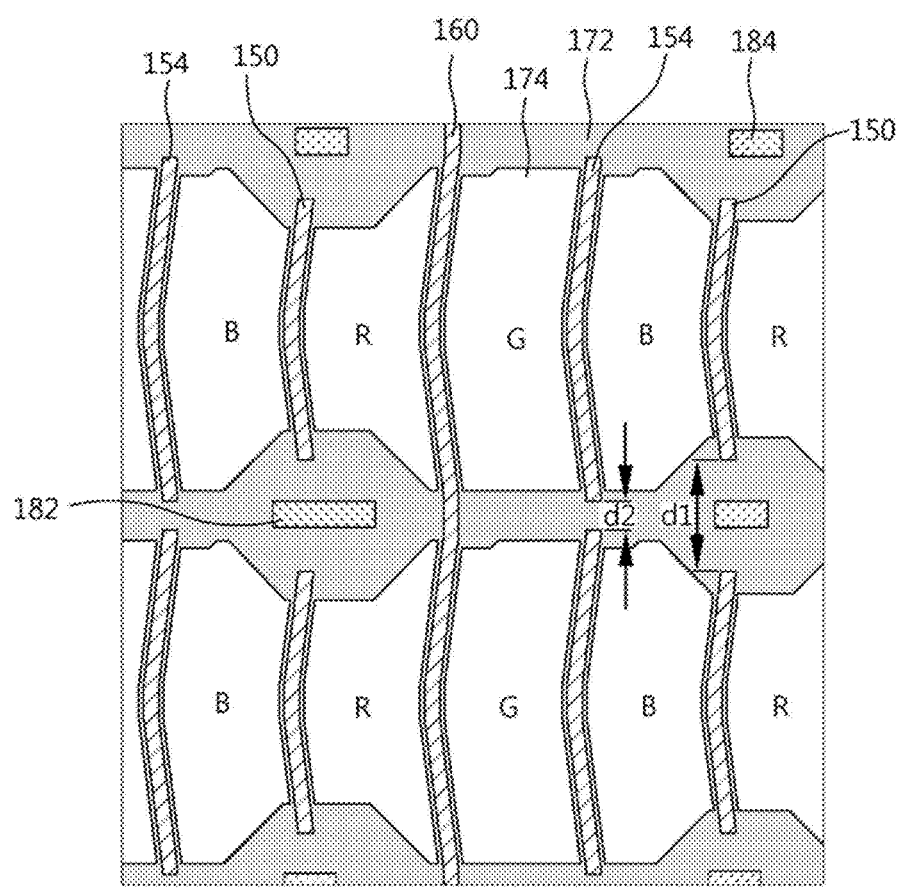
FIG. 5 is a plan view illustrating an in-cell touch type display panel in accordance with a second embodiment of the present invention.

FIG. 5 is a plan view illustrating a display panel in accordance with a second embodiment of the present invention.

The display panel illustrated in FIG. 5 includes the same constituent elements as those of the first embodiment of the present invention, except that it further includes a second stopper layer 154, and therefore a detailed description related to the same constituent elements will be omitted below or may be brief.

The second stopper layer 154 is formed to overlap the black matrix layer 172, which is located between the touch sensing line 160 and the first stopper layer 150. For example, the touch sensing line 160 overlaps the black matrix 172, which is located between the red (R) and green (G) color filters 174, and also overlaps the data line DL of the green (G) sub-pixel, which overlaps the black matrix 172. The first stopper layer 150 overlaps the black matrix 172, which is located between the blue (B) and red (R) color filters 174, and also overlaps the data line DL of the red (R) sub-pixel, which overlaps the black matrix 172. The second stopper layer 154 overlaps the black matrix 172, which is located between the green (G) and blue (B) color filters 174, and also overlaps the data line DL of the blue (B) sub-pixel, which overlaps the black matrix 172.

The first and second stopper layers 150 and 154 are formed on the planarization layer 120, which is in the same plane as the touch sensing line 160, using a metal, such as Al, Cu, Cr, Mo or Ti, which is the same material as the touch sensing line 160. Accordingly, the first and second stopper layers 150 and 154 may be formed simultaneously with the touch sensing line 160 without an additional mask process, which may reduce the manufacturing costs.

In addition, each first stopper layer 150 is spaced apart from an adjacent first stopper layer 150 with a first space, which has a first distance d1, interposed therebetween in the region of the black matrix 172, which overlaps the intersection of the gate line GL and the data line DL. Each second stopper layer 154 is spaced apart from an adjacent second stopper layer 154 with a second space, which has a second distance d2, which is smaller than the first distance d1, interposed therebetween in the region of the black matrix 172, which overlaps the intersection of the gate line GL and the data line DL. As such, the second stopper layer 154 faces the left side of each of the first and second column spacers 182 and 184, the touch sensing line 160 faces the right side of each of the first and second column spacers 182 and 184, and the first stopper layer 150 faces the upper side and the lower side of each of the first and second column spacers 182 and 184. The second stopper layer 154 and the touch sensing line 160 limit the movement of the first and second column spacers 182 and 184 even if external pressure is applied in the diagonal direction from the left lower side to the right upper side or in the diagonal direction from the left upper side to the right lower side. In addition, the first stopper layer 150 limits the movement of the first and second column spacers 182 and 184 even if external pressure is applied in the vertical direction. As such, it is possible to prevent the first and second column spacers 182 and 184 from moving to the lower alignment film 188 in the pixel area, and therefore, it is possible to prevent damage to the lower alignment film 188 located in the pixel area.

It can be appreciated that the liquid crystal display panel in accordance with the first and second embodiments of the present invention exhibits no movement of the first and second column spacers 182 and 184 until external pressure within a range from about 0.47 Kgf to 0.6 Kgf is applied as illustrated in Table 1, whereas a liquid crystal display panel of the related art exhibits light leakage attributable to movement of the first and second column spacers when external pressure of about 0.4 Kgf is applied.

TABLE 1

|  | Related Art | First Embodiment | Second Embodiment |
| --- | --- | --- | --- |
| Average Generation Pressure (Kgf) | 0.4 | 0.47 | 0.6 |

Meanwhile, the thin film transistor substrate in accordance with the embodiments of the present invention is located to be opposite the color filter substrate with the liquid crystal layer interposed therebetween, whereby the liquid crystal display panel is completed. At this time, although the fringe field structure has been described by way of example in the present invention, a horizontal field type structure or vertical field type structure may also be applied to all liquid crystal display panels.

As is apparent from the above description, according to the embodiments of the present invention, a plurality of stopper layers, formed on the same plane as a touch sensing line, is spaced apart from each other with a space therebetween, and a column spacer is located to overlap the space. The column spacer according to the present invention is inserted into a recess in an alignment film, which corresponds to the space. As such, even if external pressure is applied, movement of the column spacer is limited within the recess, which overlaps a black matrix, which may prevent damage to the alignment film. Thereby, it is possible to prevent light leakage without a reduction in an aperture ratio. In addition, even if the column spacer moves out of the recess because the external pressure is strong, the column spacer slides on the stopper layer, which may minimize movement of the column spacer located in a pixel area to the alignment film. In addition, because the stopper layers are formed of the same material as the touch sensing line, simultaneously with the formation of the touch sensing line, no additional mask process is required and no half-tone mask is required, which may prevent an increase in manufacturing costs.

The above description is merely given to describe the present invention by way of example, and numerous modifications and embodiments can be devised by those skilled in the art that will fall within the spirit and scope of the principles of this disclosure. Accordingly, the embodiments disclosed in the specification of the present invention are not intended to limit the present invention. The scope of the present invention should be construed by the following claims, and all technologies and the invention is to cover all modifications, equivalents, and alternatives falling within the spirit and scope of the invention as defined by the claims.

What is claimed is:

1. A display panel comprising:
a common electrode located on a lower substrate for receiving a user touch signal;
a touch sensing line connected to the common electrode;
a plurality of stopper layers located on a same plane as the touch sensing line and spaced apart from each other with a space therebetween; and
first and second column spacers located on an upper substrate opposite to the lower substrate, to overlap the space between the plurality of stopper layers,
a protective film on the plurality of stopper layers, and having a recess in a region corresponding to the space; and
a lower alignment film having a recess on the protective film,
wherein the first or second column spacer moves out of the recess in response to external pressure, each of the first and second column spacers slides along a stopper layer among the plurality of stopper layers, thereby minimizing a movement of the first and second column spacers to the lower alignment film so that a contact between the first and second column spacers and the lower alignment film is minimized,
wherein the stopper layer is on a same plane as the touch sensing line and formed simultaneously with the touch sensing line without an additional mask process, and
wherein the stopper layer is made of a same material as the touch sensing line.

2. The display panel according to claim 1, further comprising:
a black matrix located on the upper substrate for defining first to third sub-pixel areas that create different colors; and
a color filter located in the first to third sub-pixel areas defined by the black matrix,
wherein the touch sensing line is located to overlap the black matrix between the first and second sub-pixel areas, and
wherein a first stopper layer among the plurality of stopper layers is located to overlap the black matrix between the first and third sub-pixel areas.

3. The display panel according to claim 2, further comprising a second stopper layer among the plurality of stopper layers located to overlap the black matrix between the second and third sub-pixel areas,
wherein the second stopper layer is formed of a same material on the same plane with the touch sensing line.

4. The display panel according to claim 1, further comprising:
a gate line on the lower substrate; and
a data line located to cross the gate line to define first to third sub-pixel areas,
wherein the touch sensing line is located to overlap the data line located between the first and second sub-pixel areas, and
wherein a first stopper layer among the plurality of stopper layers is located to overlap the data line located between the first and third sub-pixel areas.

5. The display panel according to claim 4, further comprising a second stopper layer among the plurality of stopper layers located to overlap the data line located between the second and third sub-pixel areas,
wherein the second stopper layer is formed of a same material on the same plane as the touch sensing line.

6. The display panel according to claim 5, wherein the first stopper layer is spaced apart from an adjacent first stopper layer in a region of the black matrix that overlaps an intersection of the data line and the gate line located between the first and third sub-pixel areas, and
wherein the second stopper layer is spaced apart from an adjacent second stopper layer in a region of the black matrix that overlaps an intersection of the data line and the gate line located between the second and third sub-pixel areas.

7. The thin film transistor substrate according to claim 1, further comprising a plurality of other stopper layers overlapping the data line that does not overlap the touch sensing line,
  wherein the plurality of stopper layers and the plurality of other stopper layers are formed of a same material on the same plane as the touch sensing line.

8. A display panel comprising:
  a plurality of gate lines and a plurality of data lines on a first substrate;
  a common electrode sensing a user touch position for a touch sensing period;
  a plurality of touch sensing lines transmitting a user touch signal sensed by the common electrode to a touch driver;
  a plurality of stopper layers each spaced apart from an adjacent stopper layer with a space interposed therebetween;
  a protective film on the plurality of stopper layers, and having a recess in a region corresponding to the space;
  a lower alignment film having a recess on the protective film;
  a color filter on a second substrate corresponding to a plurality of sub-pixels in a unit pixel; and
  first and second column spacers on the second substrate,
  wherein the first or second column spacer moves out of the recess in response to external pressure, each of the first and second column spacers slides along a stopper layer among the plurality of stopper layers, thereby minimizing a movement of the first and second column spacers to the lower alignment film so that a contact between the first and second column spacers and the lower alignment film is minimized,
  wherein the stopper layer is on a same plane as a touch sensing line among the plurality of touch sensing lines and formed simultaneously with the touch sensing line without an additional mask process, and
  wherein the stopper layer is made of a same material as the touch sensing line.

9. The display panel according to claim 8, wherein the each of the first and second column spacers is inserted into the recess of the lower alignment film which corresponds to the space between adjacent stopper layers so that a movement of the first or second column spacer is limited within the recess of the lower alignment film.

10. The display panel according to claim 8, wherein the stopper layer is formed to overlap a data line among the plurality of data lines of any one sub-pixel among two remaining sub-pixels excluding the data line of the sub-pixel that overlaps a touch sensing line among the plurality of touch sensing lines.

11. The display panel according to claim 8, wherein each touch sensing line is located on every unit pixel including red (R), green (G) and blue (B) sub-pixels.

12. The display panel according to claim 11, wherein the each touch sensing line overlaps a data line among the plurality of data lines of at least one sub-pixel among the red (R), green (G) and blue (B) sub-pixels.

13. The display panel according to claim 8, wherein the stopper layer which is parallel to a touch sensing line among the plurality of touch sensing lines is on either side of each of the first and second column spacers.

14. The display panel according to claim 8, wherein an upper surface of the lower alignment film corresponding to the space is closer to an upper surface of the first substrate than the upper surface of the lower alignment film on the stopper layer.

* * * * *